US010103828B2

(12) United States Patent
Bin Sediq

(10) Patent No.: US 10,103,828 B2
(45) Date of Patent: Oct. 16, 2018

(54) MULTI-STAGE RECEPTION MONITORING

(71) Applicant: Telefonaktiebolaget L M Ericsson (Publ), Stockholm (SE)

(72) Inventor: Akram Bin Sediq, Ottawa (CA)

(73) Assignee: Telefonaktiebolaget LM Ericsson (Publ) (SE)

( * ) Notice: Subject to any disclaimer, the term of this patent is extended or adjusted under 35 U.S.C. 154(b) by 193 days.

(21) Appl. No.: 14/904,810

(22) PCT Filed: Dec. 29, 2015

(86) PCT No.: PCT/IB2015/060034
§ 371 (c)(1),
(2) Date: Jan. 13, 2016

(87) PCT Pub. No.: WO2017/115109
PCT Pub. Date: Jul. 6, 2017

(65) Prior Publication Data
US 2017/0187474 A1 Jun. 29, 2017

(51) Int. Cl.
*H04B 17/318* (2015.01)
*H04W 72/04* (2009.01)
(Continued)

(52) U.S. Cl.
CPC ......... *H04B 17/318* (2015.01); *H04L 1/1864* (2013.01); *H04L 5/0055* (2013.01);
(Continued)

(58) Field of Classification Search
None
See application file for complete search history.

(56) References Cited

U.S. PATENT DOCUMENTS 8,279,817 B2 10/2012 Wu
8,457,588 B2 6/2013 Kim et al.
(Continued)

FOREIGN PATENT DOCUMENTS

| EP | 2 849 359 A1 | 3/2015 |
| WO | 2012042377 A2 | 5/2012 |
| WO | 2013074015 A1 | 5/2013 |

OTHER PUBLICATIONS

E. Dahlman, S. Parkvall, and J. Sköld, "4G: LTE/LTE—Advanced for Mobile Broadband," Published by: Academic Press, pp. 127-128 and p. 195, Date of Publication Apr. 2011 consisting of 3-pages.
(Continued)

*Primary Examiner* — James P Duffy
(74) *Attorney, Agent, or Firm* — Christopher & Weisberg, P.A.

(57) ABSTRACT

A network node, method and wireless device are provided. The network node includes processing circuitry that includes a processor and a memory. The memory contains instructions that, when executed by the processor, configure the processor to configure a reception monitoring resource indicating whether there is at least a possibility that a wireless device is scheduled to receive data in a subframe. The reception monitoring resource is configured to cause the wireless device to bypass decoding of at least one control channel candidate in the subframe when the reception monitoring resource indicates the wireless device is not scheduled to read data in the subframe. The network node includes a transmitter in communication with the processing circuitry. The transmitter is configured to transmit the reception monitoring resource to the wireless device in the subframe.

32 Claims, 11 Drawing Sheets

(51) Int. Cl.
*H04L 1/18* (2006.01)
*H04L 5/00* (2006.01)
*H04W 52/02* (2009.01)

(52) U.S. Cl.
CPC ..... *H04W 52/0225* (2013.01); *H04W 72/042* (2013.01); *H04L 1/1812* (2013.01); *Y02D 70/00* (2018.01); *Y02D 70/1262* (2018.01); *Y02D 70/1264* (2018.01); *Y02D 70/24* (2018.01)

(56) References Cited

U.S. PATENT DOCUMENTS

| | | |
|---|---|---|
| 8,644,279 B2 | 2/2014 | Lindoff |
| 8,681,724 B2 | 3/2014 | Du et al. |
| 8,761,093 B2 | 6/2014 | Isaksson et al. |
| 8,780,729 B2 | 7/2014 | Dalsgaard |
| 8,811,323 B2 | 8/2014 | Kim et al. |
| 8,861,452 B2 | 10/2014 | Barbieri et al. |
| 8,861,472 B2 | 10/2014 | Frederiksen et al. |
| 8,908,555 B2 | 12/2014 | Bachl et al. |
| 8,995,432 B2 | 3/2015 | Yi et al. |
| 9,084,208 B2 | 7/2015 | Rosenqvist et al. |
| 9,084,264 B2 | 7/2015 | Cai et al. |
| 9,094,914 B2 | 7/2015 | Kim et al. |
| 9,107,190 B2 | 8/2015 | Dalsgaard et al. |
| 2011/0267957 A1 | 11/2011 | Du et al. |
| 2012/0213137 A1* | 8/2012 | Jeong ............... H04W 52/0212 370/311 |
| 2013/0194995 A1 | 8/2013 | Reinhardt et al. |
| 2013/0250925 A1* | 9/2013 | Lohr ............... H04W 72/0446 370/336 |
| 2014/0226542 A1 | 8/2014 | Gupta et al. |
| 2015/0162967 A1 | 6/2015 | Jeong et al. |
| 2015/0201456 A1 | 7/2015 | Lee et al. |
| 2015/0215944 A1 | 7/2015 | Kim et al. |
| 2015/0280871 A1 | 10/2015 | Xu et al. |

OTHER PUBLICATIONS

Junxian Huang, et al., "A Close Examination of Performance and Power Characteristics of 4G LTE Networks," Proceedings of the 10th International Conference on Mobile Systems, Applications, and Services, Published in: Proceeding MobiSys '12, pp. 225-238, Conference Date: Jun. 25-29, 2012, Low Wood Bay, Lake District, United Kingdom consisting of 14-pages.

Jonas Eriksson, et al., "Complexity Reduction of Blind Decoding Schemes Using CRC Splitting" Published in: 2012 IEEE Global Communications Conference (GLOBECOM), pp. 3731-3736, Conference Date: Dec. 3-7, 2012, Anaheim, California, USA consisting of 6-pages.

Christian Hoymann, et al., "A Lean Carrier for LTE" LTE Technology Update: Part 2, Published in: IEEE Communications Magazine vol. 51(2):74-80, Date of Publication: Feb. 14, 2013 consisting of 7-pages.

G. Stea and A. Virdis, "A Comprehensive Simulation Analysis of LTE Discontinuous Reception (DRX)", Computer Networks, vol. 73, pp. 22-40, ISSN 1389-1286, Aug. 12, 2014 consisting of 19-pages.

3GPP TS 36.321 V12.4.0, (Dec. 2014), "3rd Generation Partnership Project; Technical Specification Group Radio Access Network; Evolved Universal Terrestrial Radio Access (E-UTRA); Medium Access Control (MAC) Protocol Specification," (Release 12), Jan. 5, 2015 consisting of 60-pages.

3GPP TS 36.211 V12.4.0, (Dec. 2014), "3rd Generation Partnership Project; Technical Specification Group Radio Access Network; Evolved Universal Terrestrial Radio Access (E-UTRA); Physical channels and modulation," Release 12. Jan. 6, 2015 consisting of 124-pages.

3GPP TS 36.213 V12.4.0, (Dec. 2014), "3rd Generation Partnership Project; Technical Specification Group Radio Access Network; Evolved Universal Terrestrial Radio Access (E-UTRA); Physical Layer Procedure," Release 12, Jan. 7, 2015 consisting of 228-pages.

DRX, http://www.sharetechnote.com/html/MAC_LTE.html#DRX, Sep. 15, 2015 consisting of 4-pages.

International Search Report and Written Opinion dated Oct. 5, 2016 for International Application Serial No. PCT/IB2015/060034, International Filing Date—Dec. 29, 2015 consisting of 11-pages.

* cited by examiner

MULTI-STAGE RECEPTION MONITORING

TECHNICAL FIELD

Wireless communication and in particular to multi-stage reception monitoring for reducing power consumption in a wireless device when there is no data scheduled for the wireless device.

BACKGROUND

Packet data in a cellular network is often highly bursty in which occasional periods of transmission activity are followed by longer periods of no activity. A wireless device monitors the downlink transmissions in each subframe to receive uplink grants or downlink data transmission. Since the wireless device does not know in advance whether it is scheduled to read data in a particular subframe received by the wireless device, the wireless device is required to monitor base station transmissions for downlink control signaling. This is referred to as reception monitoring and is applicable to general cellular networks.

With respect to Long Term Evolution (LTE) and LTE-Advanced standards applied to a cellular network, reception monitoring is performed. In general, LTE standards use Orthogonal Frequency Division Multiplexing (OFDM) where the radio resources are divided into OFDM symbols in the time domain and in orthogonal narrowband sub-carriers in the frequency domain. The smallest radio-frequency element in LTE is called a resource element (RE) that consists of one OFDM symbol in time that spans 66.7 microseconds and one sub-carrier in frequency that spans 15 kHz. A resource element can carry one modulation symbol. The smallest unit that can be scheduled to a wireless device is defined as a Physical Resource Block (PRB) pair that consists of 12 subcarriers in frequency and two slots in time. Each slot consists of 6 to 7 OFDM symbols and a cycle prefix. The PRB pair spans one subframe in time that has a duration of one millisecond.

In LTE, the base station is referred to as an eNodeB (eNB) that schedules the downlink transmissions to wireless devices on a per-subframe basis. In addition to transmitting the wireless device traffic data, the eNB transmits downlink control information (DCI) to wireless devices that informs the wireless devices of the location of the PRB-pairs allocated to the respective wireless device in the Physical Downlink Shared Channel (PDSCH) and of the type of modulation and coding that the wireless device has to use to decode data received by the wireless device, in addition to other control information that is needed by the wireless device to decode the data. In LTE release 8, 9 and 10, DCI is conveyed only in Physical Downlink Control Channel (PDCCH). PDCCH is transmitted in the control region of the subframe which is located at the beginning of the subframe in up to the first four OFDM symbols. In LTE release 11, enhanced PDCCH (ePDCCH) is introduced where DCI may also be transmitted in the data region of the subframe that carries the data traffic for wireless devices.

The reception monitoring, i.e., monitoring of base station transmissions, is either performed continuously or discontinuously using discontinuous reception (DRX). In particular, the wireless device is required to perform reception monitoring in order to determine if there is downlink data intended for it. However, continuously monitoring the downlink channel results in high power consumption that reduces the wireless device's battery time. Referring to FIG. 1, to reduce wireless device power consumption, DRX cycle 10 is performed by the wireless device so that the wireless device cycles between awake states 12a-12n (collectively referred to as awake state 12) and sleep states 14a-14n (collectively referred to as sleep state 14) to preserve battery life. Further, there may be specific situations where the awake state can be extended longer than the ON duration shown in 12a, such as due to the detection of initial uplink or downlink transmission, due to the expectation of possible retransmission, and/or during contention resolution in random access. When the wireless device is in sleep state 14, the wireless device does not monitor, i.e., decode, any channel. In other words, the wireless device goes to "sleep" to save battery power.

However, when the wireless device is in awake state 12, the wireless device decodes all control channel candidates to determine whether there is data for the wireless device in the subframe. Control channel candidates refer to control channels that may or may not be assigned to the wireless device but that the wireless device nevertheless is required to decode as illustrated in FIG. 1. For example, the control channel candidates may be PDCCH candidates monitored by the wireless device, and are illustrated in Table 1.

| Type | Search space $S_k^{(L)}$ Aggregation level L | Size [in CCEs] | Number of PDCCH candidates $M^{(L)}$ |
|---|---|---|---|
| Wireless Device-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

With reference to FIG. 2, there is shown an existing single stage reception monitoring process for a wireless device implementing DRX cycle 10. The wireless device decodes all control channel candidates in a current subframes, i.e., decodes all twenty-two PDCCH candidates in the current subframe (Block S100). Such decoding involves several power consuming steps. These steps include performing convolutional decoding, verifying correctness of the decoding by checking the cyclic redundancy check (CRC), and then using the CRC and a Radio Network Temporary Identifier (RNTI), such as cell radio network temporary identifier (CRNTI), to determine if each PDCCH candidate is intended for the wireless device. The wireless device then determines whether it is configured to receive another subframe during the current awake state 12 (Block S102). If the wireless device determines it is configured to not receive another subframe during current awake state 12, i.e. wireless device 20 is reverting back to sleep state 14, the single stage reception monitoring process ends and the wireless device may enter sleep state 14 until the next awake state 12.

However, if wireless device determines it is configured to receive another subframe during the current awake state 12, the wireless device tags the other received subframe as the current subframe and repeats Blocks S100-S104 such that the wireless device continues to decode all control channel candidates of subframes received during the wireless device's current awake state. In other words, during each awake state 12, the wireless device is required to perform single stage reception monitoring by decoding all possible control channel candidates that maybe assigned to the wireless device even if there is no actual data intended for the wireless device. According to Table 1, this means that the wireless device has to decode twenty-two (22) PDCCH candidates (sum of the numbers in the last column in Table 1). For each PDCCH candidate, the wireless device is required to perform convolutional decoding, verify the correctness of the decoding by checking the cyclic redundancy code (CRC), and then use the CRC and an RNTI, such as CRNTI, in order to determine if the PDCCH candidate is intended for the wireless device.

Despite the power saving from DRX, the wireless device still wastes battery power as the wireless device is required to decode all possible control channel candidates that may be assigned to it in order to determine if the wireless device is scheduled to read data in a subframe. Therefore, in wireless communication networks such as LTE, the wireless device, in the awake state performs decoding of twenty-two PDCCH candidates in each subframe even if there is no data intended for the wireless device. This arrangement and process wastes the limited battery power of the wireless device, which serves as a critical limitation for wireless devices, especially low-powered wireless devices that are expected to be deployed in large numbers for the internet of things (IoT).

SUMMARY

Some embodiments advantageously provide a method, node and device for multi-stage reception monitoring that reduces power consumption in the wireless device when there is no data scheduled for the wireless device.

In one embodiment of the disclosure, a network node is provided. The network node includes processing circuitry that includes a processor and a memory. The memory contains instructions that, when executed by the processor, configure the processor to configure a reception monitoring resource indicating whether there is at least a possibility that a wireless device is scheduled to read data in a subframe. The reception monitoring resource is configured to cause the wireless device to bypass decoding of at least one control channel candidate in the subframe when the reception monitoring resource indicates the wireless device is not scheduled to read data in the subframe. The network node includes a transmitter in communication with the processing circuitry. The transmitter is configured to transmit the reception monitoring resource to the wireless device in the subframe.

According to one aspect of this embodiment, the reception monitoring resource is configured to cause the wireless device to decode the at least one control channel in the subframe when the reception monitoring resource indicates at least the possibility that the wireless device is scheduled to read data in the subframe. According to another aspect of this embodiment, the bypass of the decoding of at least one control channel candidate in the subframe includes bypassing the decoding all physical downlink control channels, PDCCHs, candidates in the subframe. According to another aspect of this embodiment, the memory includes further instructions that, when executed by the processor, configure the processor to assign the reception monitoring resource to the wireless device, the reception monitoring resource including data indicating whether the wireless device is scheduled to read data in the subframe.

According to another aspect of this embodiment, the reception monitoring resource is a reused resource that provides functionality in addition to reception monitoring. According to another aspect of this embodiment, the functionality of the reception monitoring resource in addition to reception monitoring includes providing Hybrid Automatic Repeat Request, HARQ, acknowledgements. According to another aspect of this embodiment, the HARQ acknowledgments include at least one of a HARQ negative acknowledgement, NACK, and a HARQ acknowledgement, ACK, the HARQ ACK. The HARQ NACK indicates at least the possibility that the wireless device is scheduled to read data in the subframe. The HARQ ACK indicates at least the possibility that the wireless device is scheduled to read data in the subframe.

According to another aspect of this embodiment, the reception monitoring resource indicates the wireless device is not scheduled to read data in the subframe is absent of the HARQ ACK and the HARQ NACK. According to another aspect of this embodiment, the reception monitoring resource is configured to provide one of the HARQ ACK and HARQ NACK to another wireless device in response to uplink transmission from the other wireless device. According to another aspect of this embodiment, the wireless device is not scheduled to receive the at least one of HARQ ACK and HARQ NACK in the reception monitoring resource in response to an uplink transmission from the wireless device.

According to another embodiment of the disclosure, a method for a network node is provided. A reception monitoring resource is configured to indicate whether there is at least a possibility that a wireless device is scheduled to read data in a subframe. The reception monitoring resource is configured to cause the wireless device to bypass decoding of at least one control channel candidate in the subframe when the reception monitoring resource indicates the wireless device is not scheduled to read data in the subframe. The reception monitoring resource is transmitted to the wireless device in the subframe. According to one aspect of this embodiment, the reception monitoring resource is configured to cause the wireless device to decode the at least one control channel candidate in the subframe when the reception monitoring resource indicates at least the possibility that the wireless device is scheduled to read data in the subframe.

According to another aspect of this embodiment, bypassing the decoding of at least one control channel candidate in the subframe includes bypassing the decoding all physical downlink control channels, PDCCHs, candidates in the subframe. According to another aspect of this embodiment, the reception monitoring resource is assigned to the wireless device, the reception monitoring resource including data indicating whether the wireless device is scheduled to read data in the subframe. According to another aspect of this embodiment, the reception monitoring resource is a reused resource that provides functionality in addition to reception monitoring.

According to another aspect of this embodiment, the functionality of the reception monitoring resource in addition to reception monitoring includes providing Hybrid Automatic Repeat Request, HARQ, acknowledgements. According to another aspect of this embodiment, the HARQ acknowledgments include at least one of a HARQ negative acknowledgement, NACK, and a HARQ acknowledgement, ACK, the HARQ ACK. The HARQ NACK indicates at least the possibility that the wireless device is scheduled to read data in the subframe. The HARQ ACK indicates at least the possibility that the wireless device is scheduled to read data in the subframe. According to another aspect of this embodiment, the reception monitoring resource indicates the wireless device is not scheduled to read data in the subframe is absent of the HARQ ACK and the HARQ NACK.

According to another aspect of this embodiment, the reception monitoring resource is configured to provide one of the HARQ ACK and HARQ NACK to another wireless device in response to uplink transmission from the other wireless device. According to another aspect of this embodiment, the wireless device is not scheduled to receive the one of HARQ ACK and HARQ NACK in the reception monitoring resource in response to an uplink transmission from the wireless device.

According to another embodiment of the disclosure, a wireless device for reception monitoring is provided. The wireless device includes a receiver configured to receive a reception monitoring resource in a subframe. The reception monitoring resource indicates whether there is at least a possibility that the wireless device is scheduled to read data in the subframe. The wireless device includes processing circuitry including a processor and a memory. The memory contains instructions that, when executed by the processor, configure the processor to determine whether the received reception monitoring resource indicates at least the possibility that the wireless device is scheduled to read data in the subframe, and when the determination is made that the reception monitoring resource indicates the wireless device is not scheduled to read data in the subframe, bypass decoding of at least one control channel candidate in the subframe.

According to one aspect of this embodiment, the memory contains further instructions that, when executed by the processor, configure the processor to decode the at least one control channel candidate in the subframe when the determination is made that the reception monitoring resource indicates at least the possibility that the wireless device is scheduled to read data in the subframe. According to another aspect of this embodiment, the decoding of the at least one control channel candidates includes decoding all physical downlink control channel, PDCCH, candidates in the subframe, and bypassing the decoding of the at least one control channel candidate includes bypassing the decoding all PDCCHs candidates in the subframe. According to another aspect of this embodiment, the reception monitoring resource is assigned to the wireless device. The reception monitoring resource includes data indicating whether the wireless device is scheduled to read data in the subframe.

According to another aspect of this embodiment, the reception monitoring resource is a reused resource that has functionality in addition to reception monitoring. According to another aspect of this embodiment, the functionality of the reception monitoring resource in addition to reception monitoring includes providing Hybrid Automatic Repeat Request, HARQ, acknowledgements. According to another aspect of this embodiment, the HARQ acknowledgments include at least one of a HARQ negative acknowledgement, NACK, and a HARQ acknowledgement, ACK, the HARQ ACK. The HARQ NACK indicates at least the possibility that the wireless device is scheduled to read data in the subframe. The HARQ ACK indicates at least the possibility that the wireless device is scheduled to read data in the subframe. According to another aspect of this embodiment, the reception monitoring resource indicates the wireless device is not scheduled to read data in the subframe is absent of the HARQ ACK and the HARQ NACK.

According to another aspect of this embodiment, the reception monitoring resource received by the wireless device is configured to provide one of the HARQ ACK and HARQ NACK to another wireless device in response to uplink transmission from the other wireless device. According to another aspect of this embodiment, the wireless device is not scheduled to receive the one of HARQ ACK and HARQ NACK in the reception monitoring resource in response to an uplink transmission from the wireless device.

According to another embodiment of the disclosure, a method for reception monitoring at a wireless device is provided. A reception monitoring resource is received in a subframe. The reception monitoring resource indicates whether there is at least a possibility that the wireless device is scheduled to read data in the subframe. A determination is made whether the received reception monitoring resource indicates at least the possibility that the wireless device is scheduled to read data in the subframe. When the determination is made that the reception monitoring resource indicates the wireless device is not scheduled to read data in the subframe, decoding of at least one control channel candidate in the subframe is bypassed.

According to one aspect of this embodiment, the at least one control channel candidate in the subframe is decoded when the determination is made that the reception monitoring resource indicates at least the possibility that the wireless device is scheduled to read data in the subframe. According to another aspect of this embodiment, the decoding of the at least one control channel candidates includes decoding all physical downlink control channel, PDCCH, candidates in the subframe. Bypassing the decoding of the at least one control channel candidate includes bypassing the decoding all PDCCHs candidates in the subframe. According to another aspect of this embodiment, the reception monitoring resource is assigned to the wireless device, the reception monitoring resource including data indicating whether the wireless device is scheduled to read data in the subframe.

According to another aspect of this embodiment, the reception monitoring resource is a reused resource that has functionality for other than reception monitoring. According to another aspect of this embodiment, the functionality of the reception monitoring resource for other than reception monitoring includes providing Hybrid Automatic Repeat Request, HARQ, acknowledgements. According to another aspect of this embodiment, the HARQ acknowledgments include at least one of a HARQ negative acknowledgement, NACK, and a HARQ acknowledgement, ACK, the HARQ ACK. The HARQ NACK indicates at least the possibility that the wireless device is scheduled to read data in the subframe. The HARQ ACK indicates at least the possibility that the wireless device is scheduled to read data in the subframe.

According to another aspect of this embodiment, the reception monitoring resource indicates the wireless device is not scheduled to read data in the subframe is absent of the HARQ ACK and the HARQ NACK. According to another aspect of this embodiment, the reception monitoring resource received by the wireless device is configured to provide one of the HARQ ACK and HARQ NACK to another wireless device in response to uplink transmission from the other wireless device. According to another aspect of this embodiment, the wireless device is not scheduled to receive the one of HARQ ACK and HARQ NACK in the reception monitoring resource in response to an uplink transmission from the wireless device.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
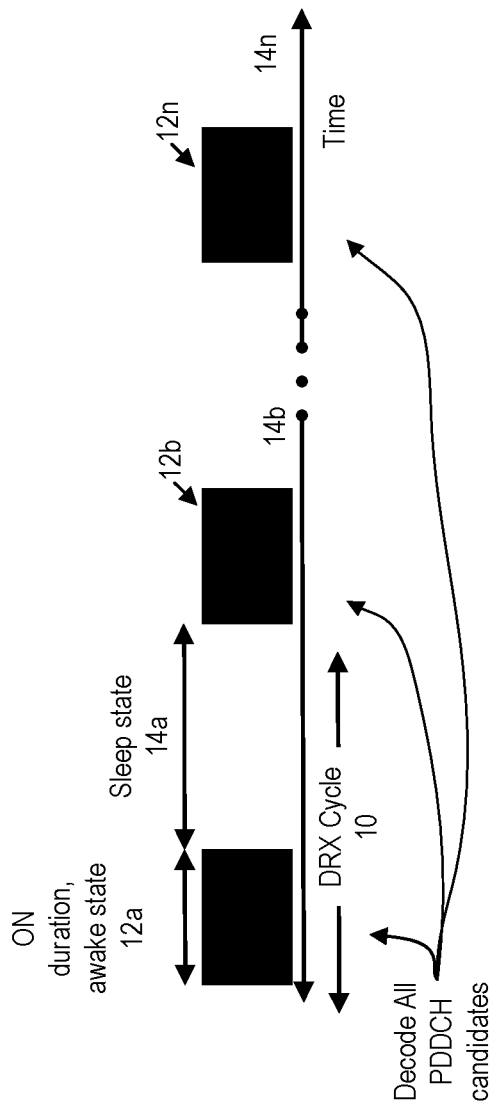
FIG. 1 is a block diagram of an existing DRX cycle.

The method(s), node(s) and devices(s) described herein advantageously provide multi-stage reception monitoring that reduces power consumption in the wireless device when there is no data scheduled for the wireless device. In particular, a reception monitoring (RM) resource is configured to indicate to the wireless device whether there is at least a possibility the wireless device is scheduled to read data in one or more subframes received or to be received by the wireless device. If the RM resource indicates no data is scheduled for the wireless device in one or more subframes, the wireless device does not decode at least one control channel candidate, thereby saving wireless device battery power associated with the decoding that typically involves convolutional decoding, correction checking of decoding via a cyclic redundancy code (CRC) and verification whether the decoded at least one control channel candidate was even intended for the wireless device, etc. In one or more embodiments, the wireless device enters the sleep state for one or more subframes based on the RM resource before decoding any control channel candidates, thereby increasing the wireless device's power savings over existing single stage monitoring (which always decodes all control channel candidates). "Control channel candidates" as used herein refer to a subset of control channels that can be used to carry control information to the wireless device. In one or more embodiments, the subset that defines the control channel candidates for a wireless device can change from subframe to subframe based on a prior agreement that is known by both the base station and wireless device. From the wireless device's perspective, there is no need to decode control channels that are not included in the control channel candidates as they will not be addressed to the wireless device.

Further, in one or more embodiments, the RM resource(s) are reused radio resource(s) that have functionality in addition to reception monitoring, thereby eliminating the bandwidth penalty of reserving radio resources for only reception monitoring. Another advantage of the instant disclosure is that latency is indirectly reduced for the same amount of wireless device battery power consumption, i.e., the battery power savings provided by the configuration described in the instant disclosure allows the wireless device to remain in the awake state for longer periods of time and thus reduce latency caused when packets arrive at the base station for the wireless device but the bases station has to wait for the wireless device to enter the awake state before transmission of the packets. In one or more embodiments, latency can be further reduced by disabling DRX without negatively affecting the wireless device's battery life as the wireless device will not unnecessarily consume battery power by decoding control channel candidates when the wireless device is not scheduled to read data in one or more subframes, i.e., the wireless device does not have data scheduled for it in one or more subframes. Also, the multi-stage RM process and configuration described herein may be implemented as an add-on service similar to voice-mail.

Before describing in detail exemplary embodiments, it is noted that the embodiments reside primarily in combinations of apparatus components and processing steps related to reception monitoring. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Figure 3:
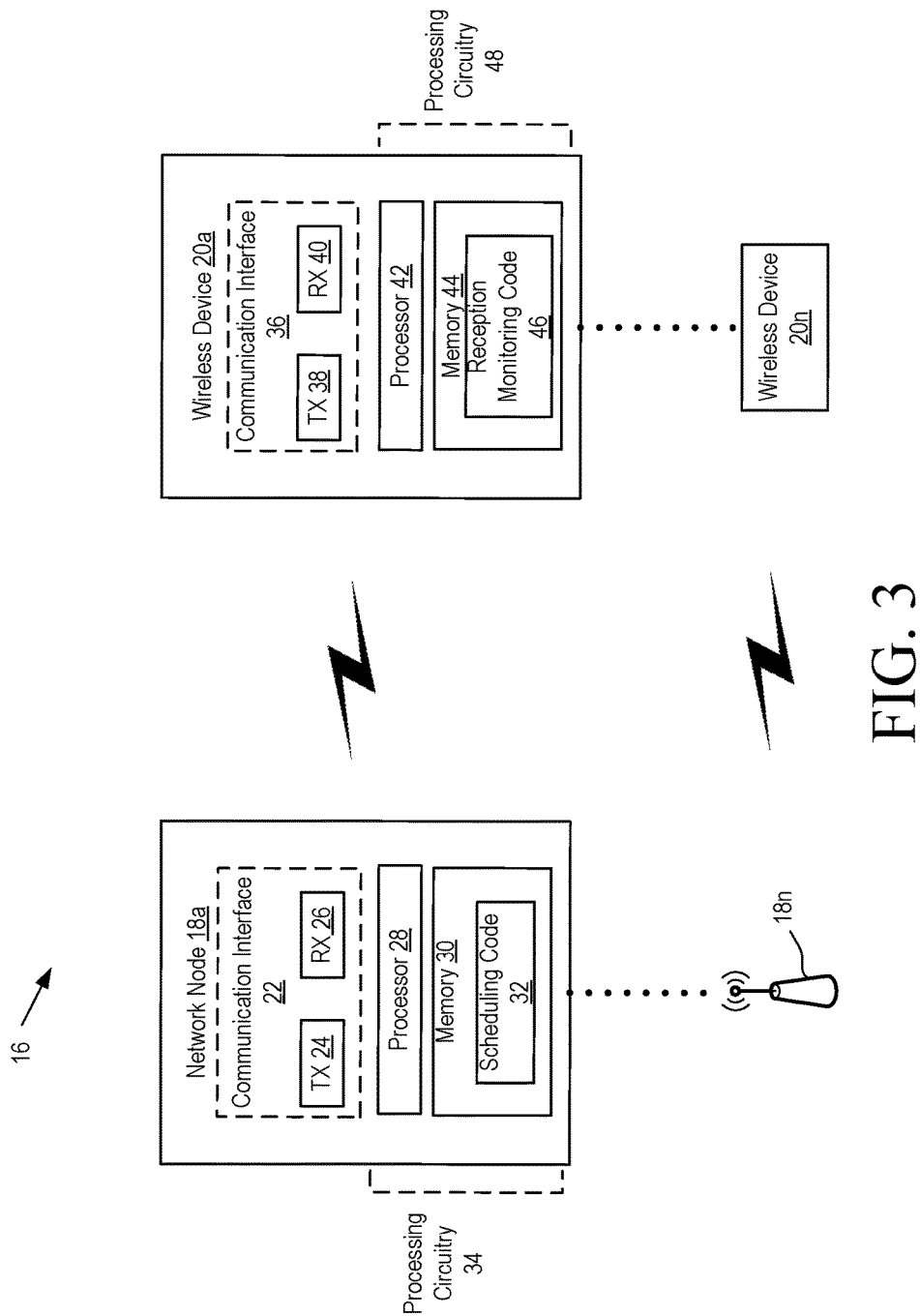
FIG. 3 is a block diagram of an exemplary system for multi-stage reception monitoring in accordance with the principles of the disclosure.

Referring again to the drawing figures in which like reference designators refer to like elements there is shown in FIG. 3 an exemplary system for multi-stage reception monitoring in accordance with the principles of the disclosure and designated generally as "16." System 16 includes one or more network nodes 18a-18n (collectively referred to as network node 18) and one or more wireless devices 20a-20n (collectively referred to as wireless device 20), in communication with each other via one or more networks, communication links and/or interfaces such as an air interface. In one or more embodiments, network node 18 and wireless device 20 are configured to use LTE and/or LTE-advance communication standards.

In one or more embodiments, network node 18 is an evolved NodeB (eNB), base station, radio base station, base transceiver station, remote radio unit (RRU), remote radio head (RRH), access point, among other types of nodes known in the art. Network node 18 includes one or more communication interfaces 22 for communicating with other network nodes 18, wireless devices 20 and/or other entities in system 16 via one or more communication protocols. In one or more embodiments, communication interface 22 includes one or more transmitters 24 for transmitting communications, and one or more receivers 26 for receiving communications.

Network node 18 includes one or more processors 28 for performing network node functions described herein. Network node 18 includes memory 30 that is configured to store code such as scheduling code 32. For example, scheduling code 32 includes instructions that, when executed by processor 28, causes processor 28 to perform the configuration and transmission of reception monitoring resources, discussed in detail with respect to FIGS. 4, 6 and 8. Memory 30 may include non-volatile and/or volatile memory. For example, non-volatile memory may include a hard drive, flash memory, programmable integrated circuits, memory stick, solid state memory and the like. Also, volatile memory may include random access memory and others known in the art. In one or more embodiments, memory 30 is any suitable tangible computer readable medium that may be utilized including hard disks, CD-ROMs, electronic storage devices, optical storage devices, or magnetic storage devices. In one or more embodiments, processor 28 and memory 30 form processing circuitry 34 containing instructions which, when executed configure processor 28 to perform the one or more functions described with respect to FIGS. 4, 6 and 8.

In one or more embodiments, wireless device 20 is a radio communication device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art. Wireless device 20 includes one or more communication interfaces 36 for communicating with network nodes 18, other wireless devices 20 and/or other entities in system 16 via one or more communication protocols. In one or more embodiments, communication interface 36 includes one or more transmitters 38 for transmitting communications, and one or more receivers 40 for receiving communications. In one or more embodiments, wireless device 20 monitors control channels such as PDCCHs and EPDCCHs. In one or more embodiments, wireless device 20 implements discontinuous reception (DRX) instead of continuously monitoring the control channels, i.e., wireless device 20 goes into cycles of predefined awake and sleep states/durations to save battery life. In particular, wireless device 20 may be configured for DRX by an RRC reconfiguration message that includes DRX parameters such as an ON duration parameter, long cycle parameter and other DRX parameters that are well known in the art. Network node 18 will synchronize in terms of DRX states as network node 18 knows precisely when wireless device 20 is in an awake state and when wireless device 20 is in a sleep state.

Figure 2:
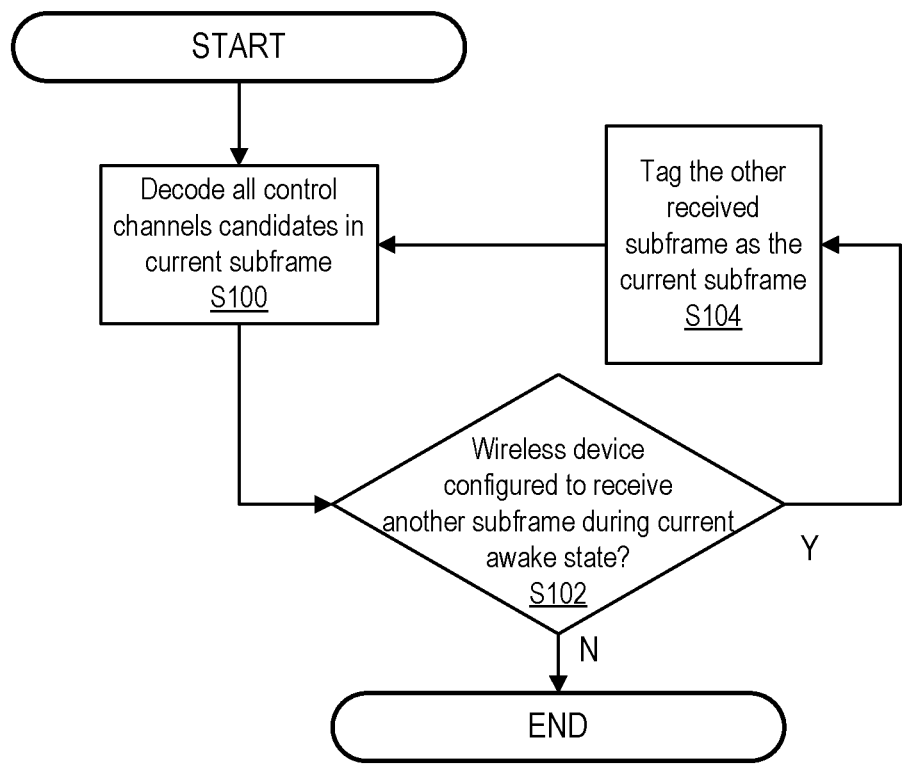
FIG. 2 is a flow chart of an existing single stage reception monitoring process.

Wireless device 20 includes processor 42 and memory 44 that corresponds to processor 28 and memory 30 but with size and performance varying based on design need. Processor 42 is configured to perform wireless device 20 functions as described herein, and memory 44 is configured to store code such as reception monitoring code 46. For example, reception monitoring code 46 includes instructions that, when executed by processor 42, causes processor 42 to perform the multi-stage reception monitoring process, discussed in detail with respect to FIGS. 5, 7 and 9. In one or more embodiments, system 16 includes a mix of wireless devices 20 configured to perform multi-stage reception monitoring, i.e., configured to execute reception monitoring code 46, and wireless device 20 (legacy wireless devices) configured to perform single stage reception monitoring as described in FIG. 2. In one or more embodiments, processor 42 and memory 44 form processing circuitry 48 containing instructions which, when executed, configure processor 42 to perform the one or more functions described with respect to FIGS. 5, 7 and 9.

Figure 4:
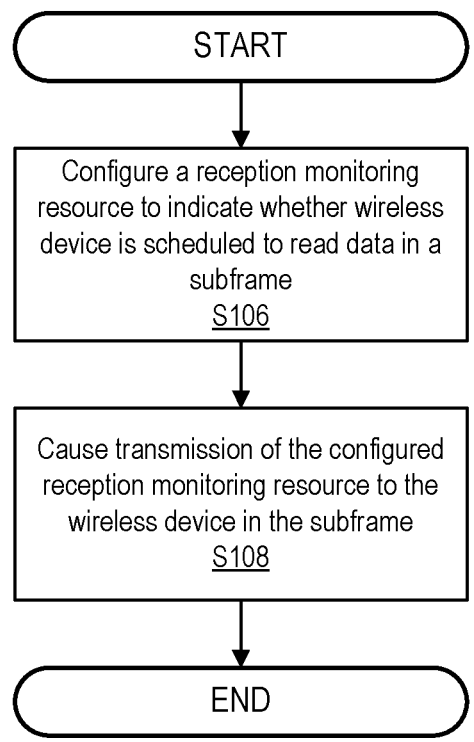
FIG. 4 is a flow diagram of an exemplary scheduling process in accordance with the principles of the disclosure.

FIG. 4 illustrates a scheduling process for configuring and transmitting at least one reception monitoring resource to allow wireless device 20 to perform multi-stage reception monitoring. Processing circuitry 34 configures a reception monitoring resource to indicate whether there is at least a possibility that wireless device 20 is scheduled to read data in a subframe, i.e., indicate whether wireless device 20 has data scheduled for it in a subframe to be received by wireless device 20 (Block S106). In one or more embodiments, the reception monitoring resource is configured to include binary information indicating whether there is at least a possibility that wireless device 20 is scheduled to read data in the subframe. In one or more other embodiments, while the reception monitoring resource may be used to carry data information or reference signals to wireless device 20 and/or other wireless devices 20, reception by wireless device 20 of any transmissions, i.e., data information and/or reference signals, in the reception monitoring resource indicates there is a possibility that wireless device 20 is scheduled to read data in the subframe, and therefore wireless device 20 will decode candidate control channels as discussed below. However, the lack of reception by wireless device 20 of transmissions such as data information and/or reference signals in the reception monitoring resource indicates wireless device 20 is not scheduled to read data in the subframe, and therefore wireless device 20 will skip decoding of the candidate control channels as discussed below.

In one or more embodiments, wireless device 20 is assigned a dedicated reception monitoring resource such that the reception monitoring resource indicates whether wireless device 20 is scheduled read data in the subframe, i.e., whether wireless device 20 is scheduled to read data in a subframe to be received by wireless device 20. However, in one or more other embodiments, the assigned reception monitoring resource is a reused resource, i.e., is not dedicated solely for wireless device 20 use, in which the reception monitoring resource will indicate at least a possibility whether wireless device 20 is scheduled to read data in the subframe. For example, the assigned reception monitoring resource may have functionality in addition to reception monitoring such as Physical HARQ Indicator Channel (PHICH) functionality. In particular, in LTE and LTE-advanced, HARQ ACK/NACK is transmitted by network node 18 in the downlink in PHICHs that are located in the first symbol in the subframe. For example, network node 18 transmits an ACK to wireless device 20 if network node 20 was able to correctly decode uplink transmissions, i.e., data and/or signaling, from wireless device 20, and a NACK if network node 18 was not able to correctly decode uplink transmissions from wireless device 20. Further, after wireless device 20 performs the uplink transmission to network node 18, wireless device 20 can determine from the uplink resource and demodulation reference signal (DMRS) cycle shift, the PHICH resource that it is required to monitor for the HARQ ACK/NACK from network node 18. In low uplink traffic situations, some PHICHs may end up going unused; for instance, if there is no uplink traffic, then all PHICH will be unused since there is no need to send HARQ ACK/NACK in response to uplink transmissions. Therefore, the PHICH resource(s) that would otherwise go unused are advantageously put to use and configured to include a HARQ acknowledgement such as an acknowledgement (ACK) or negative acknowledgment (NACK) that indicates at least a possibility whether wireless device 20 is scheduled to read data in one or more subframes associated with the PHICH resource(s), i.e., whether wireless device 20 is scheduled to read data in the one or more subframes received by wireless device 20.

Therefore, while ACK/NACK signaling is typically used to indicate successful/unsuccessful reception of data transmissions, in this reuse resource embodiment, ACK/NACK is used to provide the additional functionality of reception monitoring by indicating at least a possibility whether wireless device 20 is scheduled to read data in one or more subframes, thereby taking advantage of unused PHICH resources. Further, in these embodiments and/or other embodiments, the resource monitoring resource is configured to either include or not include ACK/NACK signaling in order to indicate whether wireless device 20 is scheduled to read data in the one or more subframes. For example, in one embodiment, the absence of ACK and NACK signaling in the reception monitoring resource indicates wireless device 20 is not scheduled to read data in the one or more subframes, and the presence of ACK or NACK signaling in the reception monitoring resource indicates at least the possibility that wireless device 20 is scheduled to read data for it in the one or more subframes. These several embodiments are discussed in detail with respect to FIGS. 6 and 8.

Processing circuitry 34 causes transmission of the reception monitoring resource in the subframe to wireless device 20 (Block S108). In one or more embodiments, the reception monitoring resource is located in the first symbol in the subframe. In one or more other embodiments, the reception monitoring resource is located in another symbol in the subframe. In yet another embodiment, the reception monitoring resource is not fixed in time and frequency. The reception monitoring resource may follow a deterministic pattern in time and frequency that is determined from the assigned reception monitoring resource identification communicated by network node 18 and/or identity of wireless device 20 such as an RNTI, including CRNTI, in LTE. That is, in each subframe, wireless device 20 knows where in time and frequency its reception monitoring resource resides by applying the reception monitoring resource identification and/or RNTI (including CRNTI) according to a previously agreed formula, i.e., a formula that is known in advance by both network node 18 and wireless device 20 similar to the way RNTI, such as CRNTI, is used by wireless device 20 and network node 18 to determine control channel candidates in LTE. This configuration advantageously allows for randomization of reception monitoring resources for better time and frequency diversity and for a reduction in collisions between wireless devices that may have the same reception monitoring resource. Therefore, network node 18 advantageously configures and transmits one or more reception monitoring resources such that wireless device 20 is able to gain the power saving benefits of multi-stage reception monitoring, described in further detail with respect to FIGS. 5, 7 and 9.

Figure 5:
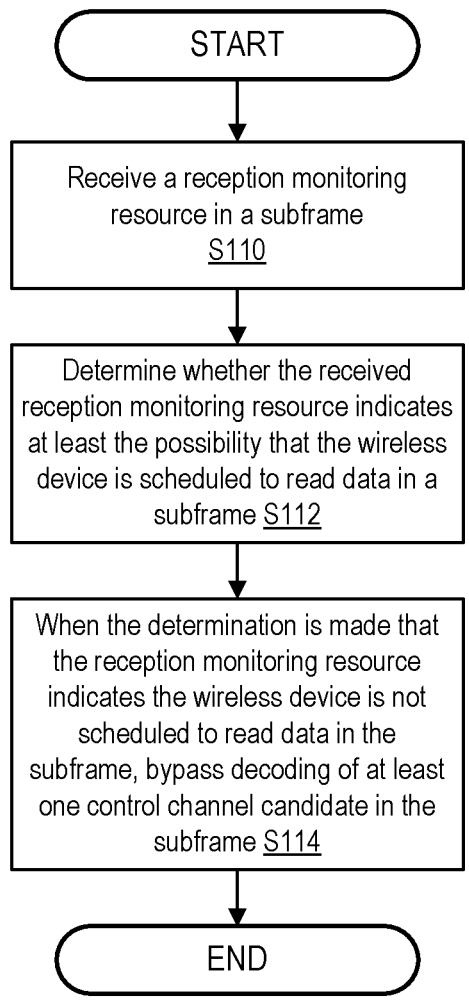
FIG. 5 is a flow diagram of an exemplary multi-stage reception monitoring process in accordance with the principles of the disclosure.

A multi-stage reception monitoring process for reducing energy power consumption in wireless device 20 when there is no data scheduled for wireless device 20 is described with reference to FIG. 5. Processing circuitry 48 receives a reception monitoring resource in a subframe (Block S110). For example, if wireless device 20 is configured with DRX, wireless device 20 will receive the reception monitoring resource during an awake state. Processing circuitry 48 determines whether the received reception monitoring resource indicates at least the possibility that the wireless device is scheduled to read data in the subframe (Block S112). In one embodiment, binary information included in the reception monitoring resource indicates whether wireless device 20 is scheduled to read data in the subframe. In another embodiment, the reception monitoring resource includes an ACK or NACK to indicate at least a possibility that wireless device 20 is scheduled to read data in the subframe. In yet another embodiment, the absence of ACK and NACK in the reception monitoring resource indicates wireless device 20 is not scheduled to read data in the subframe. In yet another embodiment, the absence of binary information indicating whether wireless device 20 is scheduled to read data in and of itself can provide the indication of whether wireless device 20 is scheduled to read data. In other words, the lack of information is the indication.

Processing circuitry 48 bypasses decoding of at least one control channel candidate in the subframe when the determination is made that the reception monitoring resource indicates wireless device 20 is not scheduled to read data in the subframe (Block S114). In particular, processing circuitry 48 bypasses the decoding of at least one control channel candidate such as a PDCCH candidate since processing circuitry 48 has determined there is no data scheduled for wireless device 20 in the subframe. In one or more embodiments, processing circuitry 48 bypasses the decoding of all control channel candidates in the subframe. Processing circuitry 48 advantageously uses the reception monitoring resource to determine whether to begin decoding of at least one control channel candidate, i.e., whether to begin steps associated with legacy single stage reception monitoring, or to skip such decoding, thereby reducing the power consumption of wireless device 20. In other words, while legacy single stage reception monitoring always performs decoding and verification steps in every subframe where the wireless device 20 is in the awake state as discussed above with respect to FIGS. 1-2, the multi-stage reception monitoring process described herein advantageously allows wireless device 20 to bypass the legacy single stage reception monitoring for the subframe when wireless device 20 is not scheduled to read data in the subframe, i.e., when wireless device 20 does not have data scheduled for it in the subframe. In this case, the multi-stage reception monitoring process includes two stages: a first stage that uses the reception monitoring resource to determine whether to begin a second stage that includes decoding control channel candidates, i.e., the second stage includes legacy decoding of control channel candidates.

In one or more embodiments, the reception monitoring resource indicates whether wireless device 20 is scheduled to read data in a plurality of subframes, thereby further increasing the power savings in wireless device 20 by allowing wireless device to remain in a sleep state longer and/or decode a reception monitor resource associated with a plurality of subframes, or further decreasing latency in receiving data from the network nodes 18 as wireless device 20 is able to remain in the awake state longer when compared to legacy single stage reception monitoring.

Figure 6:
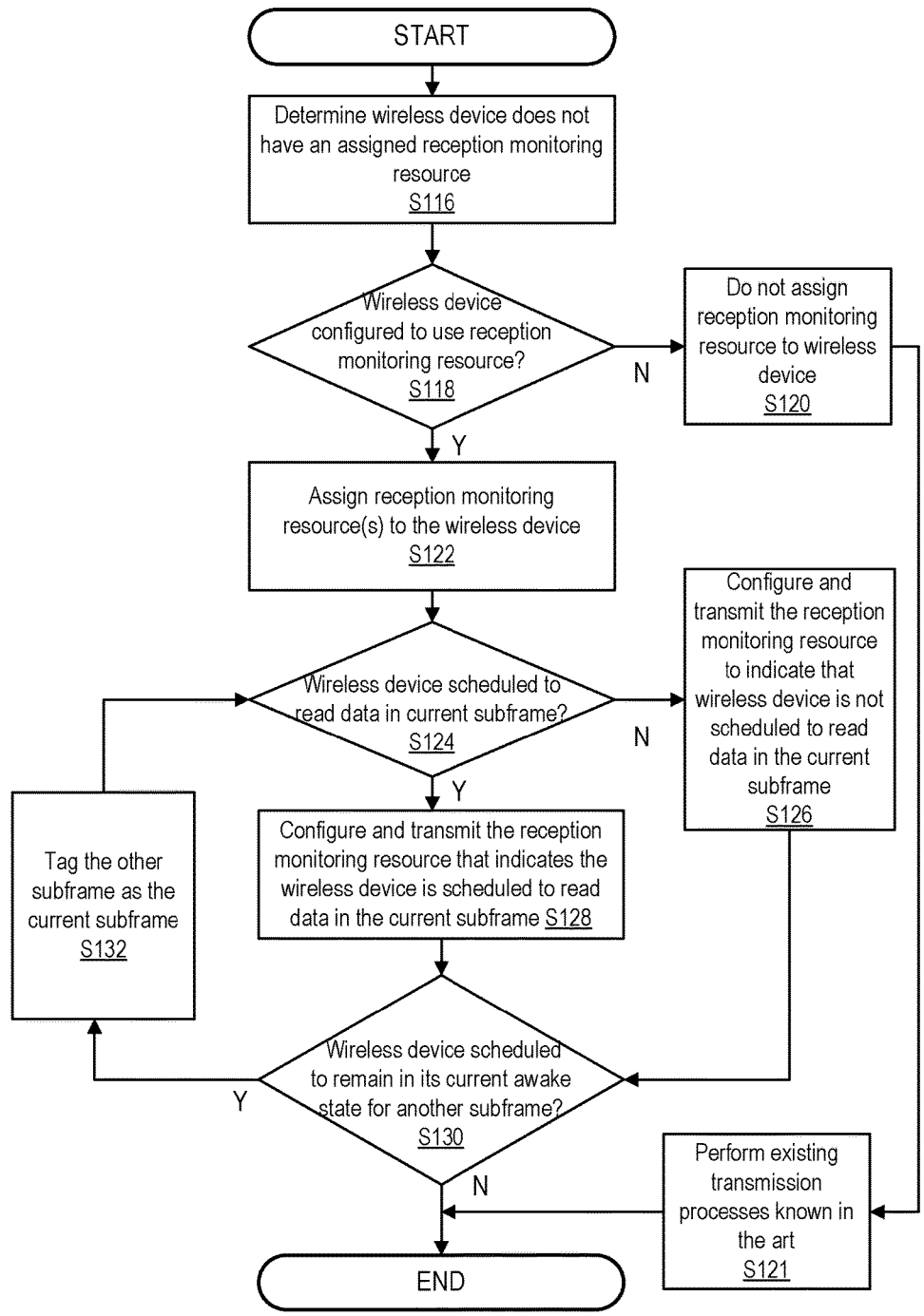
FIG. 6 is a flow diagram of an exemplary alternative scheduling process in accordance with the principles of the disclosure.

FIG. 6 illustrates an alternative scheduling process of scheduling code 32 for configuring and transmitting at least one reception monitoring resource to allow wireless device 20 to perform multi-stage reception monitoring. In this embodiment, the reception monitoring resource is dedicated to wireless device 20 and provides an indication whether wireless device 20 is scheduled to read data in the subframe, i.e., indicates whether wireless device 20 is scheduled to read data in the subframe received or to be received by wireless device 20. Processing circuitry 34 determines wireless device 20 does not have an assigned reception monitoring resource (Block S116). In one or more embodiments, the determination of Block S116 is made when wireless device 20 connects to network node 18 or when wireless device 20 requests a reception monitoring resource.

Processing circuitry 34 determines whether wireless device 20 is configured to use a reception monitoring resource (Block S118). For example, in a network that includes both legacy wireless devices 20 and "enhanced" wireless devices 20, i.e., wireless device 20 configured to execute scheduling code 32, processing circuitry 34 determines whether wireless device 20 is an enhanced wireless device 20. If processing circuitry 34 determines wireless device is not configured to use a reception monitoring resource, i.e., wireless device 20 lacks scheduling code 32 or is not authorized to execute scheduling code 32, processing circuitry 34 does not assign a dedicated reception monitoring resource to wireless device 20 (Block S120). In this case where wireless device 20 is not assigned a reception monitoring resource, processing circuitry 34 performs existing transmission processes known in the art such as where network node 18 configures the subframe for wireless device 20 to perform single stage reception monitoring processes described in FIGS. 1-2 (Block S121).

If processing circuitry 34 determines wireless device 20 is configured to use the reception monitoring resource, processing circuitry 34 assigns a reception monitoring resource to wireless device 20 (Block S122). In one or more embodiments, network node 18 semi-statically uses higher layer signaling such as radio resource control (RRC) signaling in LTE to communicate to wireless device 20 the reception monitoring resource assigned to it. Further, in one or more embodiments, network node 18 uses RRC signaling to release the assigned reception monitoring resource from wireless device 20, which causes wireless device 20 to use single stage reception monitoring, i.e., decodes all control channel candidates when it is in the awake state, thereby allowing for semi-static control, at the wireless device level, of the type of reception monitoring implemented at wireless device 20 via RRC signaling.

In one or more other embodiments, network node 18 dynamically uses MAC control elements to signal to wireless device 20 the reception monitoring resource that wireless device 20 is supposed to use. Further, in one or more embodiments, network node 18 also uses MAC control elements to signal to wireless device 20 to release the assigned reception monitoring resource, which causes wireless device 20 to use single stage reception monitoring, i.e., decode all control channel candidates when it is in the awake state, thereby allowing for dynamic control, at the wireless device level, of the type of reception monitoring implemented at wireless device 20 via MAC control elements. In one or more other embodiments, there exist an implicit reception monitoring resource assignment between network node 18 and wireless device 20 based on a prior agreement on the reception monitoring resource to be assigned to wireless device 20 based on the identify of wireless device 20, similar, but not limited, to the way wireless device 20 identifies its PDCCH candidates based on an RNTI such as a CRNTI.

After assignment of the reception monitoring resource, processing circuitry 34 determines whether wireless device 20 is scheduled to read data in the current subframe (Block S124). If processing circuitry 34 determines wireless device 20 is not scheduled to read data in the current subframe, i.e., wireless device 20 does not have data scheduled for it in the current subframe, processing circuitry 34 configures the reception monitoring resource to indicate wireless device 20 is not scheduled to read data in the current subframe, and causes transmission of the configured reception monitoring resource to wireless device 20 (Block S126). In one or more embodiments, transmission characteristics such as timing, coding, etc. of the reception monitoring resource conforms to one or more communication standards such as LTE and LTE-advanced communication standards. In one or more embodiments where wireless device 20 is assigned a dedicated resource, the reception monitoring resource is configured to include binary information indicating wireless device 20 is not scheduled to read data in the subframe. The specific binary information used to indicate whether wireless device 20 is scheduled to receive data may vary based on design need so long as wireless device 20 is able to decode the binary information for multi-stage reception monitoring.

Referring back to Block S124, if processing circuitry 34 determines wireless device 20 is scheduled to read data in the current subframe, processing circuitry 34 configures and transmits the reception monitoring resource to indicate that wireless device is scheduled to read data in the current subframe (Block S128). In one or more embodiments where wireless device 20 is assigned a dedicated resource, the reception monitoring resource is configured to include binary information indicating wireless device 20 is scheduled to read data in the subframe.

After configuring and transmitting the configured reception monitoring resource for the current subframe, processing circuitry 34 determines whether wireless device 20 is scheduled to remain in its current awake state for another subframe, i.e., whether wireless device 20 can receive another subframe during the current awake state of wireless device 20 before reverting back to the sleep state (Block S130). If processing circuitry 34 determines wireless device 20 is not scheduled to remain in its current awake state for another subframe, i.e., wireless device 20 is not to receive another subframe during the current awake state because, for example, wireless device 20 is entering the sleep state, the scheduling process for wireless device 20 ends, at least until wireless device 20 returns back into the awake state. If processing circuitry 34 determines wireless device 20 is scheduled to remain in its current awake state for another subframe, processing circuitry 34 tags the other subframe that is to be transmitted to wireless device 20 as the "current subframe" and proceeds to Block S124 (Block S132).

Therefore, network node 18 assigns, configures and transmits reception monitoring resource(s) to wireless device 20 in order to allow wireless device 20 to take advantage of the reception monitoring resource to perform multi-stage reception monitoring, thereby reducing power consumption at wireless devices 20. While FIG. 6 has been described under the assumption that wireless device 20 implements a DRX cycle, the scheduling process of FIG. 6 and its reduced power consumption benefits are equally applicable to wireless devices 20 that do not implement DRX. Further, as used herein, the "reception monitoring resource" may refer to one or more resources.

Figure 7:
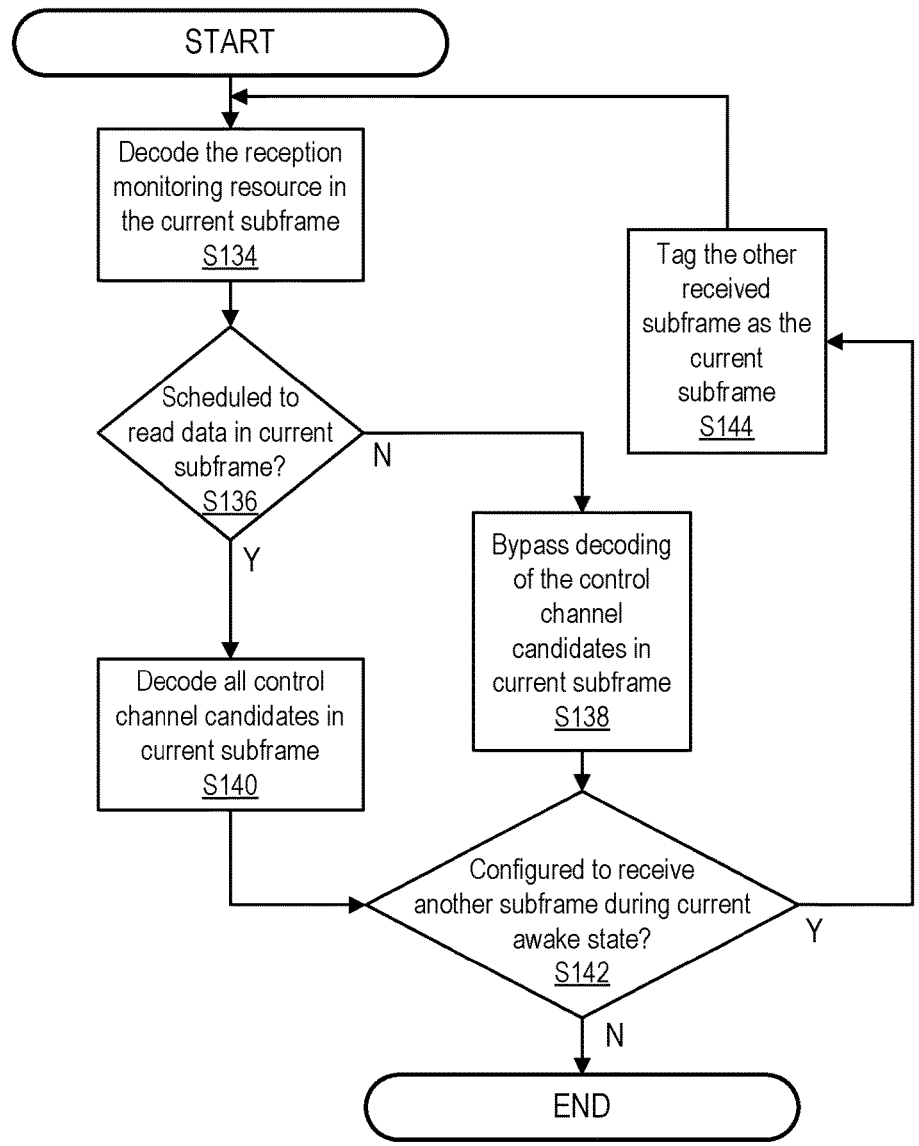
FIG. 7 is a flow diagram of an exemplary alternative multi-stage reception monitoring process in accordance with the principles of the disclosure.

FIG. 7 illustrates an alternative multi-stage reception monitoring process for reducing energy power consumption in wireless device 20 when there is no data scheduled for wireless device 20, i.e., when wireless device 20 is not scheduled to read data. Processing circuitry 48 decodes the reception monitoring resource in the current subframe (Block S134). As described above with respect to Block S122 in FIG. 6, wireless device 20 knows it has been assigned a reception monitoring resource and also knows where in the subframe the reception monitoring resource is located. Therefore, wireless device 20 is able to decode the reception monitoring resource before determining whether to decode at least one control channel candidate in the subframe.

Processing circuitry 48 determines whether wireless device 20 is scheduled to read data in the current subframe, i.e., whether wireless device 20 has data scheduled for it in the current frame, based on the decoded reception monitoring resource (Block S136). If processing circuitry 48 determines that wireless device 20 is not scheduled to read data in the current subframe based on the decoded reception monitoring resource, processing circuitry 48 does not decode control channel candidates in the current subframe (Block S138). In other words, processing circuitry 48 bypasses or skips the decoding of at least once control channel candidate or all control channel candidates, e.g., PDCCH candidates, since wireless device 20 has determined it is not scheduled to read data in the current subframe. By skipping the "blind" decoding of existing single stage reception monitoring when wireless device 20 does not have data scheduled for it, i.e., is not scheduled to read data, that is described with respect to known solutions of FIGS. 1-2, the multi-stage reception monitoring process is able to provide various benefits such as a reduction in wireless device 20 battery consumption and/or reduced latency.

Referring back to Block S136, if processing circuitry 48 determines wireless device 20 is scheduled to read data in the current subframe, processing circuitry 48 decodes all control channel candidates, e.g., all PDCCH candidates, in the current subframe (Block S140). In one or more embodiments, Block S136 corresponds to Block S100 of existing single stage reception monitoring. Processing circuitry 48 determines whether wireless device 20 is configured to receive another subframe during the current awake state (Block S142). If processing circuitry 48 determines wireless device 20 is configured to not receive another subframe because, for example, wireless device 20 is entering the sleep state, the multi-stage reception monitoring process ends, at least until the wireless device re-enters the awake state. If processing circuitry 48 determines wireless device 20 is configured to receive another subframe, processing circuitry 48 tags the other received subframe as the "current subframe" and proceeds to Block S136 (Block S134). In this embodiment, the multi-stage reception monitoring process includes two stages: a first stage the uses the reception monitoring resource to determine whether to begin the second stage of decoding control channel candidates.

Figure 8:
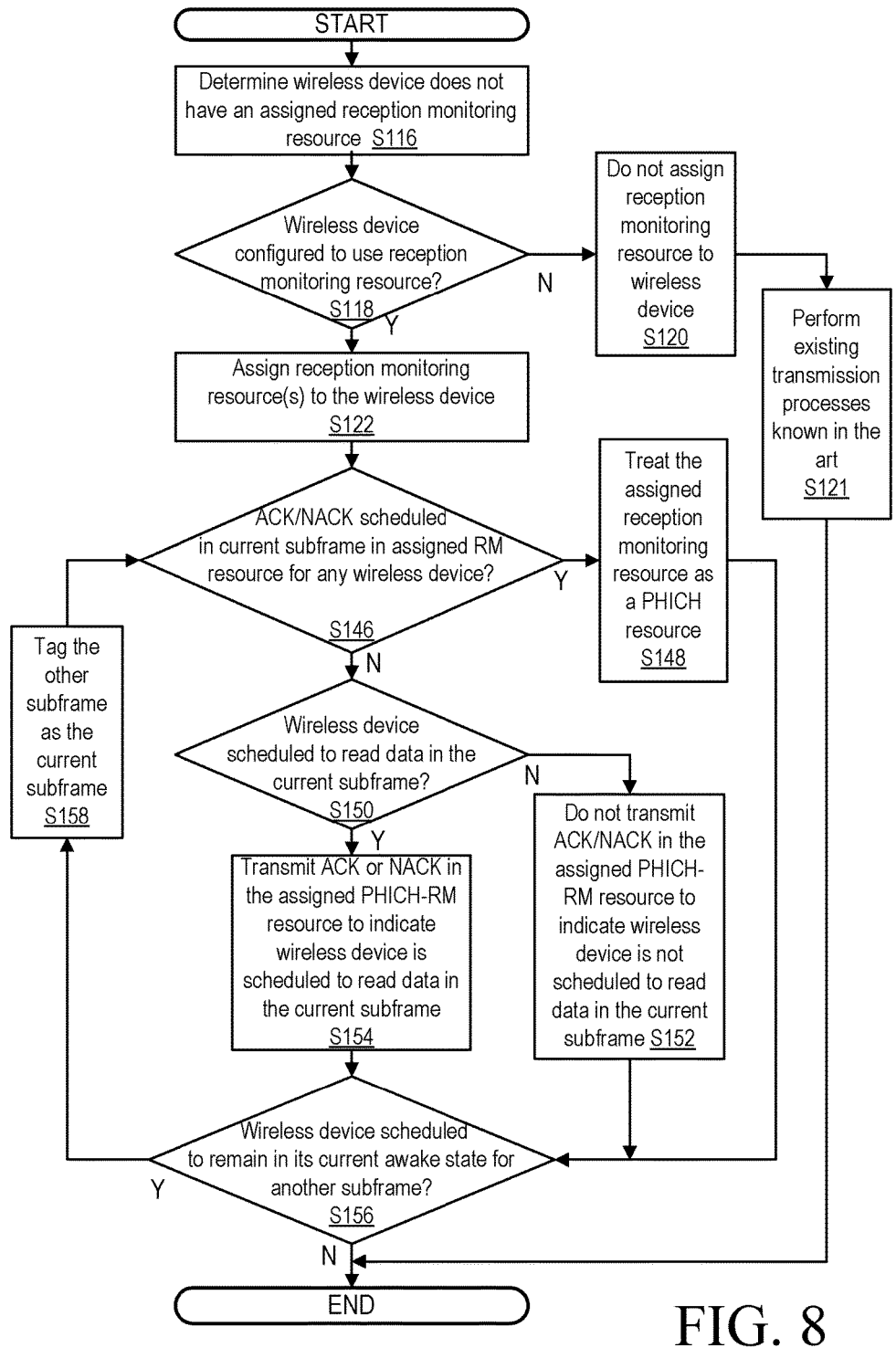
FIG. 8 is a flow diagram of another exemplary alternative scheduling process in accordance with the principles of the disclosure.

FIG. 8 illustrates another alternative scheduling process of scheduling code 32 for configuring and transmitting at least one reception monitoring resource to allow wireless device 20 to perform multi-stage reception monitoring. In particular, the reception monitoring resource is a reuse resource such as a physical hybrid ARQ indicator channel (PHICH) resource, herein referred to as a PHICH reception monitoring resource as it has the added reception monitoring functionality. Blocks S116-S122 are discussed in detail with respect to FIG. 6. In particular, processing circuitry 34 assigns wireless device 20 a PHICH reception monitoring resource that has the capability of providing an indication as to at least a possibility whether wireless device 20 is scheduled to read data in the subframe and has the capability of providing an ACK/NACK to at least one wireless device 20 in system 16. Processing circuitry 34 determines if an ACK/NACK is scheduled in the current subframe in the assigned reception monitoring (RM) resource for any wireless device 20 (Block S146). For example, the PHICH reception monitoring may be scheduled to provide an ACK/NACK to another wireless device 20 in response to uplink communications from the other wireless device 20 such that the PHICH reception monitoring should not be used to provide an indication whether wireless device 20 is scheduled to read data, i.e., PHICH functionality has priority over PHICH reception monitoring functionality in this embodiment. If processing circuitry 34 determines an ACK/NACK is scheduled in the PHICH to any wireless device 20 in response to uplink communications, processing circuitry 34 treats the assigned PHICH reception monitoring resource as a PHICH resource (Block S148). PHICH resource functionality is well known in the art.

If processing circuitry 34 determines that an ACK/NACK is not scheduled in the PHICH reception monitoring resource for any wireless device 20, processing circuitry 34 determines whether wireless device 20, which is assigned the PHICH reception monitoring resource, is scheduled to read data in the current subframe (Block S150). If processing circuitry 34 determines wireless device 20 is not scheduled to read data in the current subframe, processing circuitry 34 does not transmit an ACK/NACK in the PHICH reception monitoring resource thereby indicating that wireless device 20 is not scheduled to read data in the current subframe (Block S152). In other words, wireless device 20 will be able to determine it does not have data scheduled for it in the current subframe if the PHICH reception monitoring resource does not include an ACK or NACK.

Referring back to Block S150, if processing circuitry 34 determines wireless device 20 is scheduled to read data in the current subframe, processing circuitry 34 causes transmission of one of an ACK and NACK in the assigned PHICH reception monitoring resource, thereby indicating that wireless device 20 is scheduled to read data in the current subframe (Block S154). In other words, in these embodiments, reception of one of an ACK or NACK indicates wireless device 20 is scheduled to read data in the current subframe to be received by wireless device 20.

Processing circuitry 34 determines whether wireless device 20 is scheduled to remain in its current awake state for another subframe, i.e., determines whether wireless device 20 can receive another subframe during the current awake state of wireless device 20 (Block S156).

If processing circuitry 34 determines wireless device 20 is not scheduled to remain in its current awake state for another subframe, i.e., wireless device 20 is not to receive another subframe during the current awake state of wireless device 20 because, for example, wireless device 20 is reverting back into a sleep state, the scheduling processing ends. However, if processing circuitry 34 determines wireless device 20 is scheduled to remain in its current awake state for another subframe, processing circuitry 34 tags the other subframe the "current subframe" and proceeds to Block S146 (Block S158). While the transmission of one of an ACK and NACK in this embodiment, is used to indicate that wireless device 20 is scheduled to read data in the subframe, other configurations of PHICH reception monitoring resources are equally applicable. Referring back to Block S148, after the assigned reception monitoring resource in the current subframe is treated as a PHICH resource, processing circuitry 34 performs the determination of Block S156.

Figure 9:
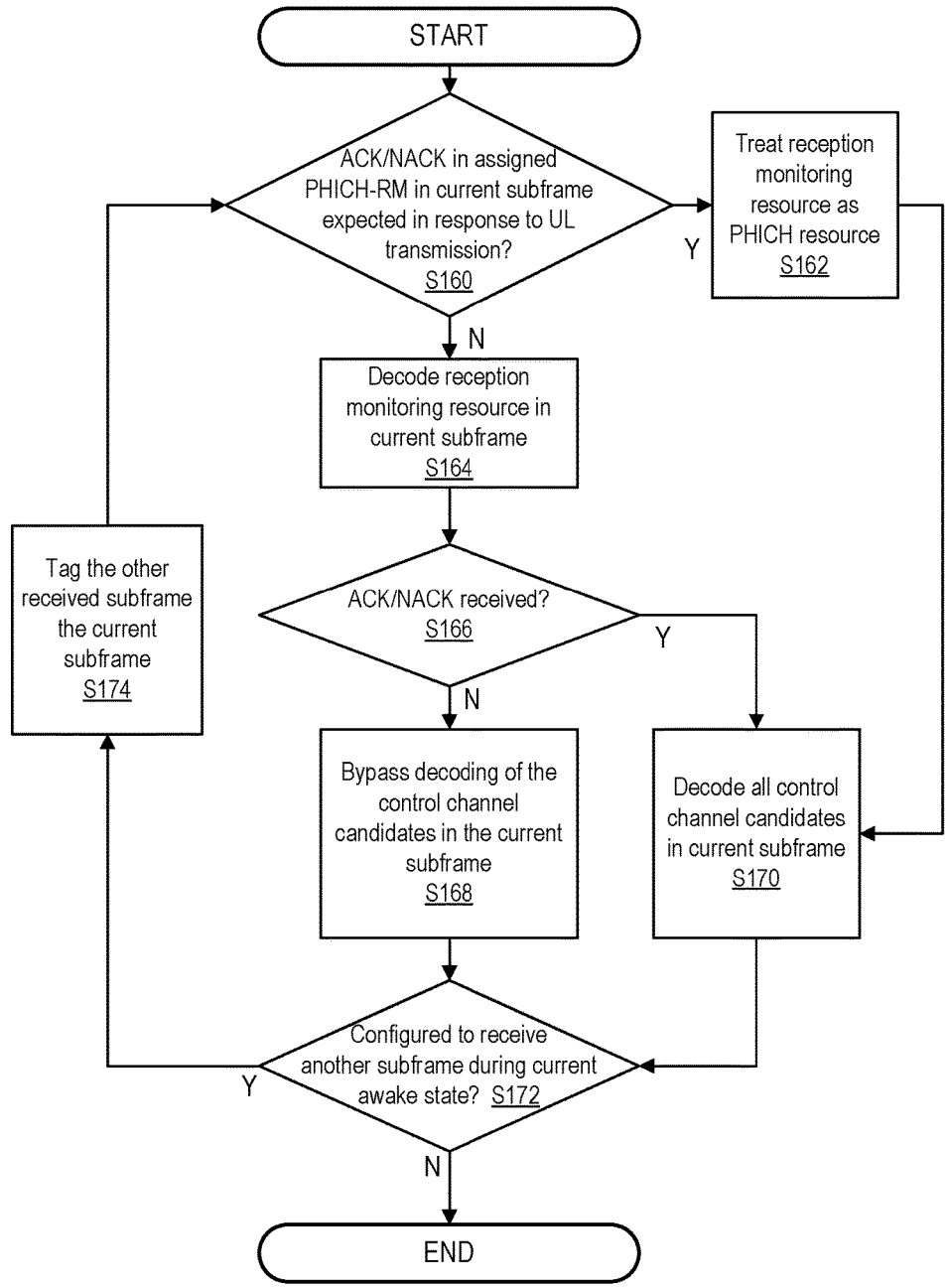
FIG. 9 is a flow diagram of another exemplary alternative multi-stage reception monitoring process in accordance with the principles of the disclosure.

FIG. 9 illustrates another alternative multi-stage reception monitoring process for reducing energy power consumption in wireless device 20 when there is no data scheduled for wireless device 20. In particular, the alternative multi-stage reception monitoring process of FIG. 9 uses the PHICH reception monitoring resource described in FIG. 8. Processing circuitry 48 determines whether an ACK/NACK in the assigned PHICH reception monitoring (PHICH-RM) resource is expected in response to an uplink transmission of wireless device 20 (Block S160). In other words, wireless device 20 determines whether the PHICH reception monitoring resource is being used as a PHICH reception monitoring resource as described above or as a PHICH resource that indicates whether uplink transmissions from wireless device 20 were successfully received.

If processing circuitry 48 determines an ACK/NACK in the PHICH reception monitoring resource in the current subframe is expected in response to uplink transmissions, processing circuitry 48 treats the PHICH reception monitoring resource as a PHICH resource and wireless device 20 will decode all control channel candidates (Block S162). If processing circuitry 48 determines an ACK/NACK in the PHICH reception monitoring resource in the current subframe is not expected in response to an uplink transmission from wireless device 20, processing circuitry 48 decodes the PHICH reception monitoring resource in the current subframe (Block S164). Processing circuitry 48 determines whether one of an ACK and NACK is included in the PHICH reception monitoring resource (Block S166). If processing circuitry 48 determines that neither an ACK and NACK is included in the PHICH reception monitoring resource, processing circuitry 48 does not decode the control channel candidates in the current subframe (Block S168). In other words, processing circuitry 48 bypasses or skips the decoding of at least once control channel candidate or all control channel candidates, e.g., PDCCH candidates, since wireless device 20 has determined that wireless device 20 is not scheduled in the current subframe based on the decoded PHICH reception monitoring resource. By avoiding the "blind" decoding of existing single stage reception monitoring described in FIGS. 1-2, the multi-stage reception monitoring process is able to reduce wireless device 20 battery consumption and/or reduce base station transmission latency.

If processing circuitry 48 determines one of an ACK and NACK is included in the PHICH reception monitoring resource, processing circuitry 48 decodes all control channel candidates such as all PDCCH candidates in the current subframe (Block S170). In this embodiment, the reception of an "artificial" ACK or NACK indicates that wireless device 20 is scheduled to read data in the subframe. Processing circuitry 48 determines whether wireless device 20 is configured to receive another subframe during the current awake state (Block S172). If processing circuitry 48 determines wireless device 20 is configured to not receive another subframe during the current awake state, i.e., wireless device is ending the current awake state and reverting back to the sleep state for a predetermined period of time, the reception monitoring process ends. If processing circuitry 48 determines wireless device 20 is configured to receive another subframe during the current awake state, processing circuitry tags the other received subframe as the current subframe and proceeds to Block S160 (Block S174).

In one situation where the PHICH reception monitoring resource is treated as a standard PHICH resource, as described in Block S148, wireless device 20 may receive an ACK/NACK in the assigned PHICH reception monitoring resource that was not expected by the wireless device 20 and that was intended for another wireless device 20 as a standard PHICH ACK/NACK. In this situation, wireless device 20, which is assigned the PHICH reception monitoring resource, will perform decoding as described in FIG. 9 even though wireless device 20 may not be scheduled to read data in the subframe. Hence, in this embodiment, the reception monitoring resource or PHICH reception monitoring resource indicates at least a possibility that wireless device 20 is scheduled in the subframe as there is a chance that a received ACK/NACK was meant for another device. However, in other embodiments described herein such as the dedicated reception monitoring resource, the reception monitoring resource indicates more than a possibility that wireless device 20 is scheduled in the subframe as it indicates, definitively, whether wireless device 20 is scheduled in the subframe.

While this embodiment of FIG. 9 reuses resources which may result in less battery power savings in a high uplink load when compared to the dedicated resource embodiment of FIG. 6 due to wireless device 20 receiving ACK/NACK destined for another wireless device 20, wireless device 20 gains most in battery savings when there is a light uplink load in the network such that most PHICH resources are not occupied for sending ACK/NACK in response to uplink transmissions. This embodiment provides better spectrum utilization than the dedicated reception monitoring resource embodiment as it reuses existing resources rather than assigning dedicated resources to wireless device 20. Further, the embodiment of FIG. 9 provides battery power savings over DRX using existing single stage reception monitoring described in FIGS. 1-2.

Figure 10:
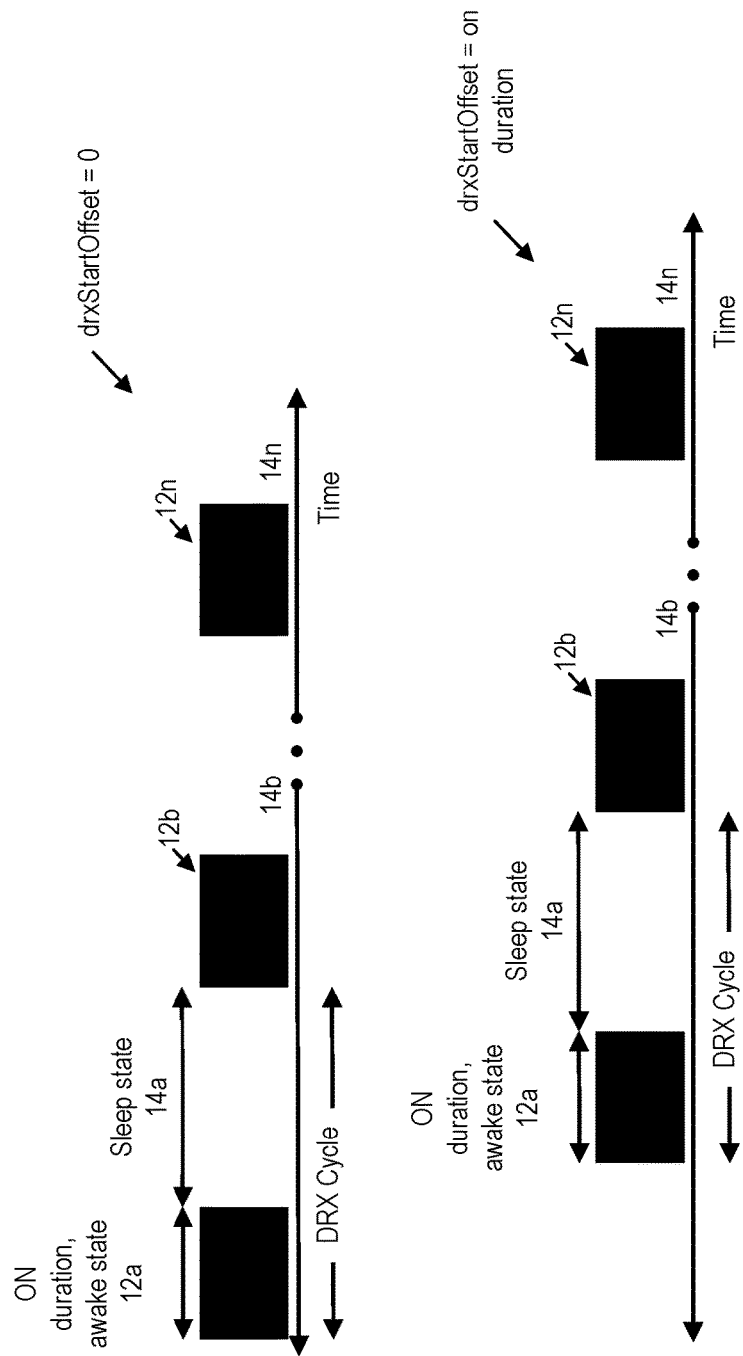
FIG. 10 is a block diagram of an exemplary offset embodiment in accordance with the principles of the disclosure.

As discussed above, the reception monitoring resource can be assigned to multiple wireless devices 20. FIG. 10 illustrates one embodiment that helps reduce the probability of transmitting the same reception monitoring resource to multiple wireless devices 20 at the same time when the reception monitoring resource is assigned to multiple wireless devices 20. In particular, the embodiment of FIG. 10 uses an offset where multiple wireless devices 20 with the same reception monitoring resource are assigned different active times such as when resources are limited. In this case, network node 18 configures DRX cycles of at least two wireless devices 20 to avoid assigning the same reception monitoring resource to the at least two wireless devices 20 that overlap in their active times. For example, one DRX parameter is "drxStartOffest" that defines the starting time with respect to a subframe number when wireless device 20 is activated by the "onDurationTimer", which is another DRX parameter. By jointly assigning "drxStartOffset" and reception monitoring resources, network node 18 is able to reduce the probability of having multiple wireless devices 20 with the same reception monitoring resource in the active/awake state at the same time. As illustrated in FIG. 10, two DRX cycle patterns for two different wireless devices 20 with two different "drxStartOffset" parameters are illustrated in which these wireless devices 20 share reception monitoring resource(s). Therefore, the two on-duration times of wireless devices 20 will not overlap. While, there may still exist specific situations where wireless device 20 detects activity and therefore starts its drx-inactivity timer, thereby possibility leading to some overlapping in awake times between wireless devices, the offset embodiment of FIG. 10 still helps reduce the occurrences of such overlap. Further, even if some overlap occurs, the only penalty paid by wireless devices 20 is that one or more wireless devices 20 may lose battery power savings provided by the reception monitoring resource, but reception reliability will not be degraded.

Figure 11:
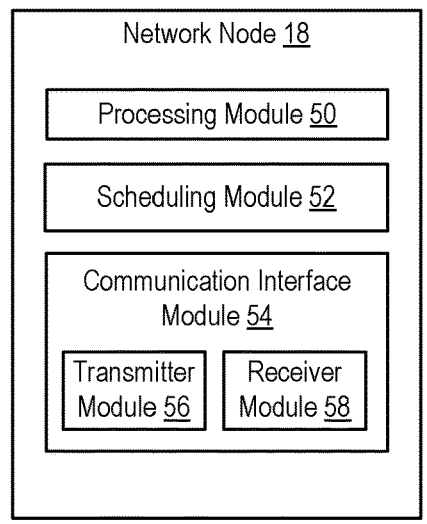
FIG. 11 is a block diagram of another exemplary network node in accordance with the principles of the disclosure.

Referring to FIG. 11, another exemplary network node 18 is illustrated. Network node 18 includes processing module 50 for performing network node 18 functions described herein with respect to processing circuitry 34. Network node 18 includes scheduling module 52 for performing the scheduling process described in detail with respect to scheduling code 32 and FIGS. 4, 6 and 8. Further, network node 18 includes communication interface module 54 for performing communication functions described herein with respect to communication interface 22. In one or more embodiments, communication interface module 54 include transmitter module 50 and receiver module 58 for performing transmission and reception functions described in detail with respect to transmitter 24 and receiver 26.

In one or more embodiments, network node 18 includes processing module 50 in communication with scheduling module 52. Processing module 50 is configured to configure a reception monitoring resource indicating whether there is at least a possibility that wireless device 20 is scheduled to receive data in a subframe. The reception monitoring resource being configured to cause wireless device 20 to bypass decoding of at least one control channel candidate in the subframe when the reception monitoring resource indicates wireless device 20 is not scheduled to read data in the subframe. Network node 18 further includes transmitter module 56 in communication with processing module 50. Transmitter module 56 is configured to transmit the reception monitoring resource to wireless device 20 in the subframe.

Figure 12:
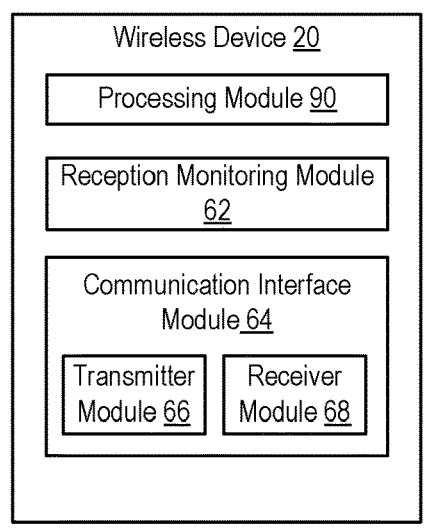
FIG. 12 is a block diagram of another exemplary wireless device in accordance with the principles of the disclosure.

FIG. 12 illustrates another exemplary wireless device 20. Wireless device 20 includes processing module 60 for performing wireless device 20 functions described herein with respect to processing circuitry 42. Wireless device 20 includes reception monitoring module 62 for performing the reception monitoring process described in detail with respect to reception monitoring code 46 and FIGS. 5, 7 and 9. Wireless device 20 includes communication interface module 64 for performing communication functions described herein with respect to communication interface 36. In one or more embodiments, communication interface module 64 includes transmitter module 66 and receiver module 68 for performing transmission and reception functions described herein with respect to transmitter 38 and receiver 40.

In one or more embodiments, wireless device 20 includes processing module 90 in communication with reception monitoring module 62 and receiver module 68. Receiver module 68 is configured to receive a reception monitoring resource in a subframe. The reception monitoring resource indicates whether there is at least a possibility that wireless device 20 is scheduled to read data in the subframe. Processing module 90 is configured to determine whether the received reception monitoring resource indicates at least the possibility that wireless device 20 is scheduled to read data in the subframe, and when the determination is made that the reception monitoring resource indicates wireless device 20 is not scheduled to read data in the subframe, bypass decoding of at least one control channel candidate in the subframe.

While several embodiments described herein include DRX, i.e., implement DRX cycles, the disclosure is equally applicable to wireless devices 20 that do not implement DRX and in some cases are in a continuous awake state. Such an embodiment advantageously provides battery power saving while at the same time meeting stringent latency requirements, i.e., latency of transmission/reception is reduced by keeping wireless device continuously in the awake state.

In one or more other embodiments, the binary information included in the reception monitoring resource includes additional information such as a subset of the control channel candidates to be decoded if wireless device 20 is scheduled the subframe. The subset can include one or more control channel candidates such that wireless device 20 only needs to decode a subset of the control channel candidates rather than decoding all possible control channel candidates when the reception monitoring resource indicates wireless device 20 is scheduled in the subframe, thereby reducing power consumption. In one or more embodiments, the additional information indicates multiple subframes where wireless device 20 is not scheduled such that wireless device can remain in the sleep state longer, thereby increasing power savings of wireless device 20. In one example, reception monitoring resource indicates wireless device 20 is not scheduled for a number of subframes such that wireless device 20 is able to remain the sleep state longer. In one or more embodiments, to accommodate the additional information, the reception monitoring resource(s) are increased, or an additional PHICH resource is allocated to wireless device 20.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node, comprising:
   processing circuitry, the processing circuitry including a processor and a memory, the memory containing instructions that, when executed by the processor, configure the processor to:
   configure a reception monitoring resource indicating whether there is at least a possibility that a wireless device is scheduled to receive data in a subframe, the reception monitoring resource being a reused resource that provides functionality in addition to reception monitoring, the additional functionality including Hybrid Automatic Repeat Request, HARQ, acknowledgements; and
   the reception monitoring resource being configured to cause the wireless device to bypass decoding of at least one control channel candidate in the subframe to be received by the wireless device when the reception monitoring resource indicates the wireless device is not scheduled to read data in the subframe; and
   a transmitter in communication with the processing circuitry, the transmitter configured to transmit the reception monitoring resource to the wireless device in the subframe.

2. The network node of claim 1, wherein the reception monitoring resource is configured to cause the wireless device to decode the at least one control channel in the subframe when the reception monitoring resource indicates at least the possibility that the wireless device is scheduled to read data in the subframe.

3. The network node of claim 1, wherein the bypass of the decoding of at least one control channel candidate in the subframe includes bypassing the decoding of all physical downlink control channels, PDCCHs, candidates in the subframe.

4. The network node of claim 1, wherein the memory includes further instructions that, when executed by the processor, configure the processor to assign the reception monitoring resource to the wireless device, the reception monitoring resource including data indicating whether the wireless device is scheduled to read data in the subframe.

5. The network node of claim 1, wherein the HARQ acknowledgments include at least one of a HARQ negative acknowledgement, NACK, and a HARQ acknowledgement, ACK;
   the HARQ NACK indicating at least the possibility that the wireless device is scheduled to read data in the subframe; and
   the HARQ ACK indicating at least the possibility that the wireless device is scheduled to read data in the subframe.

6. The network node of claim 5, wherein the reception monitoring resource indicating the wireless device is not scheduled to read data in the subframe is absent of the HARQ ACK and the HARQ NACK.

7. The network node of claim 5, wherein the reception monitoring resource is configured to provide one of the HARQ ACK and HARQ NACK to another wireless device in response to uplink transmission from the other wireless device.

8. The network node of claim 5, wherein the wireless device is not scheduled to receive the at least one of HARQ ACK and HARQ NACK in the reception monitoring resource in response to an uplink transmission from the wireless device.

9. A method for a network node, comprising:
   configuring a reception monitoring resource indicating whether there is at least a possibility that a wireless device is scheduled to receive data in a subframe, the reception monitoring resource being a reused resource that provides functionality in addition to reception monitoring, the additional functionality including Hybrid Automatic Repeat Request, HARQ, acknowledgements, the reception monitoring resource being configured to cause the wireless device to bypass decoding of at least one control channel candidate in the subframe to be received by the wireless device when the reception monitoring resource indicates the wireless device is not scheduled to read data in the subframe; and transmitting the reception monitoring resource to the wireless device in the subframe.

10. The method of claim 9, wherein the reception monitoring resource is configured to cause the wireless device to decode the at least one control channel candidate in the subframe when the reception monitoring resource indicates at least the possibility that the wireless device is scheduled to read data in the subframe.

11. The method of claim 9, wherein bypassing the decoding of at least one control channel candidate in the subframe includes bypassing the decoding of all physical downlink control channels, PDCCHs, candidates in the subframe.

12. The method of claim 9, wherein the reception monitoring resource is assigned to the wireless device, the reception monitoring resource including data indicating whether the wireless device is scheduled to read data in the subframe.

13. The method of claim 9, wherein the HARQ acknowledgments include at least one of a HARQ negative acknowledgement, NACK, and a HARQ acknowledgement, ACK;

the HARQ NACK indicating at least the possibility that the wireless device is scheduled to read data in the subframe; and the HARQ ACK indicating at least the possibility that the wireless device is scheduled to read data in the subframe.

14. The method of claim 13, wherein the reception monitoring resource indicating the wireless device is not scheduled to read data in the subframe is absent of the HARQ ACK and the HARQ NACK.

15. The method of claim 13, wherein the reception monitoring resource is configured to provide one of the HARQ ACK and HARQ NACK to another wireless device in response to uplink transmission from the other wireless device.

16. The method of claim 13, wherein the wireless device is not scheduled to receive the one of HARQ ACK and HARQ NACK in the reception monitoring resource in response to an uplink transmission from the wireless device.

17. A wireless device for reception monitoring, the wireless device comprising:

a receiver, the receiver configured to receive a reception monitoring resource in a subframe, the reception monitoring resource indicating whether there is at least a possibility that the wireless device is scheduled to read data in the subframe, the reception monitoring resource is a reused resource that provides functionality in addition to reception monitoring, the additional functionality including Hybrid Automatic Repeat Request, HARQ, acknowledgements;

processing circuitry, the processing circuitry including a processor and a memory, the memory containing instructions that, when executed by the processor, configure the processor to:

determine whether the received reception monitoring resource indicates at least the possibility that the wireless device is scheduled to read data in the subframe; and when the determination is made that the reception monitoring resource indicates the wireless device is not scheduled to read data in the subframe, bypass decoding of at least one control channel candidate received in the subframe.

18. The wireless device of claim 17, wherein the memory contains further instructions that, when executed by the processor, configure the processor to decode the at least one control channel candidate in the subframe when the determination is made that the reception monitoring resource indicates at least the possibility that the wireless device is scheduled to read data in the subframe.

19. The wireless device of claim 18, wherein the decoding of the at least one control channel candidates includes decoding of all physical downlink control channel, PDCCH, candidates in the subframe; and bypassing the decoding of the at least one control channel candidate includes bypassing the decoding of all PDCCHs candidates in the subframe.

20. The wireless device of claim 17, wherein the reception monitoring resource is assigned to the wireless device, the reception monitoring resource including data indicating whether the wireless device is scheduled to read data in the subframe.

21. The wireless device of claim 17, wherein the HARQ acknowledgments include at least one of a HARQ negative acknowledgement, NACK, and a HARQ acknowledgement, ACK;

the HARQ NACK indicating at least the possibility that the wireless device is scheduled to read data in the subframe; and the HARQ ACK indicating at least the possibility that the wireless device is scheduled to read data in the subframe.

22. The wireless device of claim 21, wherein the reception monitoring resource indicating the wireless device is not scheduled to read data in the subframe is absent of the HARQ ACK and the HARQ NACK.

23. The wireless device of claim 21, wherein the reception monitoring resource received by the wireless device is configured to provide one of the HARQ ACK and HARQ NACK to another wireless device in response to uplink transmission from the other wireless device.

24. The wireless device of claim 21, wherein the wireless device is not scheduled to receive the one of HARQ ACK and HARQ NACK in the reception monitoring resource in response to an uplink transmission from the wireless device.

25. A method for reception monitoring at a wireless device, comprising:

receiving a reception monitoring resource in a subframe, the reception monitoring resource indicating whether there is at least a possibility that the wireless device is scheduled to read data in the subframe, the reception monitoring resource being a reused resource that provides functionality in addition to reception monitoring, the additional functionality including Hybrid Automatic Repeat Request, HARQ, acknowledgements;

determining whether the received reception monitoring resource indicates at least the possibility that the wireless device is scheduled to read data in the subframe; and when the determination is made that the reception monitoring resource indicates the wireless device is not scheduled to read data in the subframe, bypassing decoding of at least one control channel candidate received in the subframe.

26. The method of claim 25, further comprising decoding the at least one control channel candidate in the subframe when the determination is made that the reception monitoring resource indicates at least the possibility that the wireless device is scheduled to read data in the subframe.

27. The method of claim 26, wherein the decoding of the at least one control channel candidates includes decoding of all physical downlink control channel, PDCCH, candidates in the subframe; and bypassing the decoding of the at least one control channel candidate includes bypassing the decoding of all PDCCHs candidates in the subframe.

28. The method of claim 25, wherein the reception monitoring resource is assigned to the wireless device, the reception monitoring resource including data indicating whether the wireless device is scheduled to read data in the subframe.

29. The method of claim 25, wherein the HARQ acknowledgments include at least one of a HARQ negative acknowledgement, NACK, and a HARQ acknowledgement, ACK;

the HARQ NACK indicating at least the possibility that the wireless device is scheduled to read data in the subframe; and the HARQ ACK indicating at least the possibility that the wireless device is scheduled to read data in the subframe.

30. The method of claim 29, wherein the reception monitoring resource indicating the wireless device is not scheduled to read data in the subframe is absent of the HARQ ACK and the HARQ NACK.

31. The method of claim 29, wherein the reception monitoring resource received by the wireless device is configured to provide one of the HARQ ACK and HARQ NACK to another wireless device in response to uplink transmission from the other wireless device.

32. The method of claim 29, wherein the wireless device is not scheduled to receive the one of HARQ ACK and HARQ NACK in the reception monitoring resource in response to an uplink transmission from the wireless device.

* * * * *